(12) United States Patent
Mocanu et al.

(10) Patent No.: US 10,805,189 B2
(45) Date of Patent: Oct. 13, 2020

(54) SYSTEMS AND METHOD FOR SHARED VISUALIZATION LIBRARY

(71) Applicant: ServiceNow, Inc., Santa Clara, CA (US)

(72) Inventors: Ciprian Mocanu, Amsterdam (NL);
Aida Rikovic Tabak, Amsterdam (NL);
Robert-Jan Barmentloo, Leiden (NL);
Andrei-Mihai Gabur, Almere (NL);
Benedetto Fiorelli, Amsterdam (NL);
Georgi Ivanov, Amstelveen (NL);
Jimmy Castex, Amstelveen (NL);
Johannes von Sichart, Pleasanton, CA (US)

(73) Assignee: ServiceNow, Inc., Santa Clara, CA (US)

( * ) Notice: Subject to any disclaimer, the term of this patent is extended or adjusted under 35 U.S.C. 154(b) by 9 days.

(21) Appl. No.: 16/254,161

(22) Filed: Jan. 22, 2019

(65) Prior Publication Data
US 2020/0236013 A1 Jul. 23, 2020

(51) Int. Cl.
*H04L 12/26* (2006.01)
*G06T 11/20* (2006.01)
(Continued)

(52) U.S. Cl.
CPC .............. *H04L 43/045* (2013.01); *G06F 9/54* (2013.01); *G06F 16/26* (2019.01); *G06T 11/206* (2013.01)

(58) Field of Classification Search
CPC . G06T 11/206; H04L 29/0899; H04L 43/045; H04L 67/36
See application file for complete search history.

(56) References Cited

U.S. PATENT DOCUMENTS 6,678,887 B1  1/2004 Hallman
6,816,898 B1  11/2004 Scarpelli
(Continued)

FOREIGN PATENT DOCUMENTS

EP     3065070 A1  *  9/2016  ............ H04L 67/10

OTHER PUBLICATIONS

Rodrigues et al.; "Monitoring of cloud computing environments", Proceedings of the 31st Annual ACM Symposium on Applied Computing, Apr. 4, 2016; pp. 378-383 (XP058256653).
(Continued)

*Primary Examiner* — Jeffery A Brier
(74) *Attorney, Agent, or Firm* — Fletcher Yoder PC

(57) ABSTRACT

Visualizations are automatically generated based at least on an identifier that identifies a report. One or more data sets and style configurations are retrieved from a shared visualization library via a backend API based on the received identifier and passed to a router component. The router component includes a switch that renders a score component, which generates a score visualization, if the retrieved data sets include score data. If the data sets include time series data, or the score visualization also includes a time series graph, the router component renders a time series component that passes the data sets and the style configurations to a parser that parses the data sets and the style configurations and outputs one or more highcharts options objects. A highcharts component generates the time series visualizations and/or adds the time series graph to the score visualization based on the highcharts options objects.

20 Claims, 10 Drawing Sheets

(51) Int. Cl.
*G06F 16/26* (2019.01)
*G06F 9/54* (2006.01)

(56) References Cited

U.S. PATENT DOCUMENTS

| | | |
|---|---|---|
| 7,020,706 B2 | 3/2006 | Cates |
| 7,350,209 B2 | 3/2008 | Shum |
| 7,890,802 B2 | 2/2011 | Gerber |
| 8,983,982 B2 | 3/2015 | Rangarajan |
| 9,065,783 B2 | 6/2015 | Ding |
| 9,122,552 B2 | 9/2015 | Whitney |
| 9,508,051 B2 | 11/2016 | Falk |
| 9,535,674 B2 | 1/2017 | Cooper |
| 9,557,969 B2 | 1/2017 | Sharma |
| 9,819,729 B2 | 11/2017 | Moon |
| 2012/0120078 A1 | 5/2012 | Hubbard |
| 2014/0207693 A1* | 7/2014 | Horst .................. G06Q 30/018 705/317 |
| 2014/0282053 A1 | 9/2014 | Hauschild et al. |
| 2016/0212222 A1* | 7/2016 | Bultema ............. H04L 41/0813 |
| 2017/0026254 A1* | 1/2017 | Adylov .................. H04L 51/34 |
| 2017/0053080 A1* | 2/2017 | Geppert ................. G06Q 10/06 |
| 2017/0185609 A1 | 6/2017 | Braghin et al. |
| 2017/0228447 A1 | 8/2017 | Catania et al. |
| 2018/0174060 A1* | 6/2018 | Velez-Rojas ............. G06N 5/02 |

OTHER PUBLICATIONS

International Search Report and Written Opinion for PCT Application No. PCT/US2020/014133 dated Apr. 14, 2020, 15 pgs.

* cited by examiner

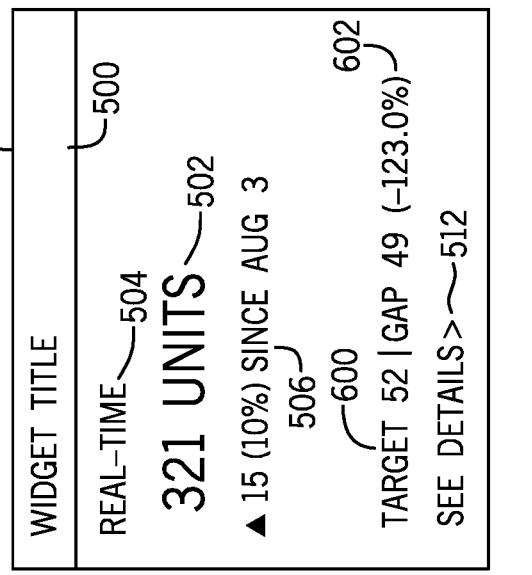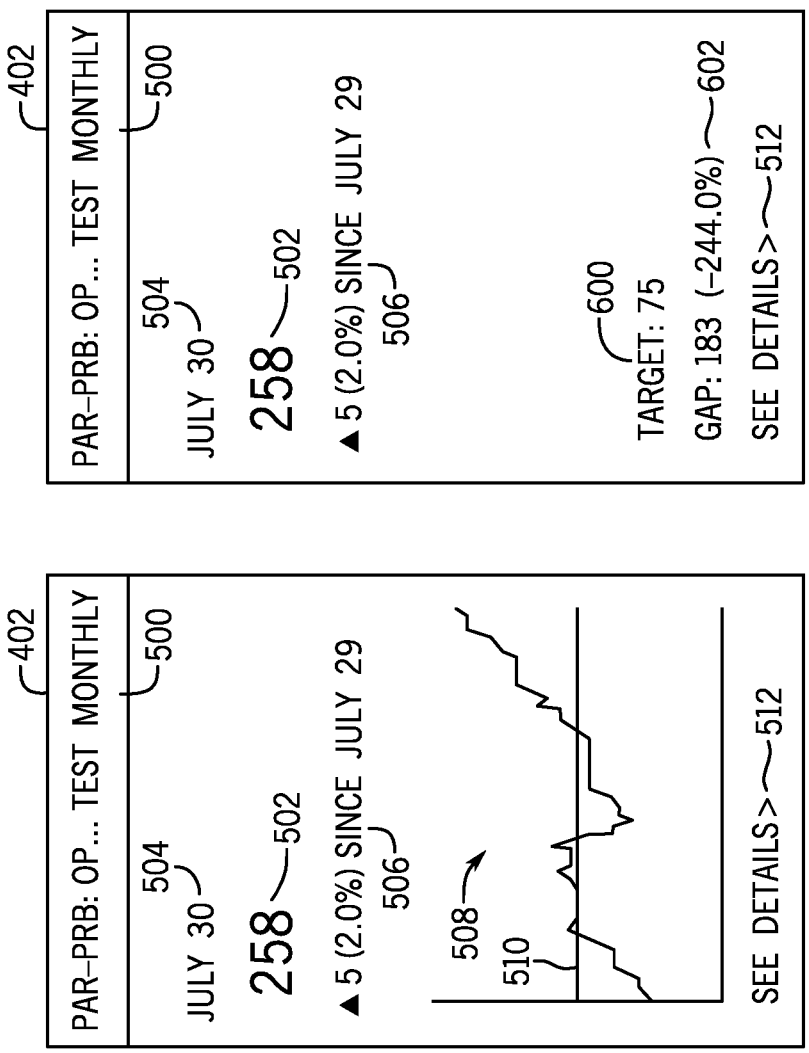

SYSTEMS AND METHOD FOR SHARED VISUALIZATION LIBRARY

BACKGROUND

The present disclosure relates generally to generating visualizations for one or more tracked metrics associated with provided cloud computing services.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Tracking one or more metrics associated with the cloud computing services may help to achieve more efficient allocation of cloud computing resources and/or a more streamlined cloud computing service. In some cases, tracked metrics may be incorporated into visualizations that visually represent the tracked metrics. However, designing visualizations manually may require specialized knowledge of computer programming, as well as the underlying tracked metrics. Further, manual design of visualizations may result in disjointed and non-uniform aesthetics across multiple visualizations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques include generating a visualization (e.g., a score visualization or a time series visualization) based at least on a received identifier. For a workspace environment visualization, a public component receives an identifier (e.g., "sys_id") that identifies a report. The public component then retrieves one or more data sets and one or more style configurations from a shared visualization library via a backend API and passes the retrieved data sets and style configurations to a router component. For visualizations intended for homepages, dashboards, and/or reports, a component (e.g., "PAR Visualization Component") receives an identifier (e.g., "sys_id") that identifies a report, data sets, style configurations, or some combination thereof. In some embodiments, the PAR Visualization Component may be a React component. The PAR Visualization Component then retrieves one or more data sets and one or more style configurations from the shared visualization library via the backend API and passes the retrieved data sets and style configurations to the router component. The router component includes a switch that renders a score component if the retrieved data sets include score data. The score component may then output a score visualization. If the data sets include time series data, or the score visualization also includes a time series graph, the router component renders a time series component. The time series component passes the data sets and the style configurations to a parser that parses the data sets and the style configurations and outputs one or more highcharts options objects to the time series component. The time series component then passes the highcharts options objects to a highcharts component that generates the time series visualizations and/or adds the time series graph to the score visualization.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 is an embodiment of a score visualization, generated by the visualization builder of FIG. 6, that includes time series information, in accordance with aspects of the present disclosure;

FIG. 8 is an embodiment of a score visualization, generated by the visualization builder of FIG. 6, that does not include time series information, in accordance with aspects of the present disclosure;

FIG. 9 illustrates an embodiment of a score visualization widget, generated by the visualization builder of FIG. 6, in accordance with aspects of the present disclosure;

DETAILED DESCRIPTION

Figure 1:
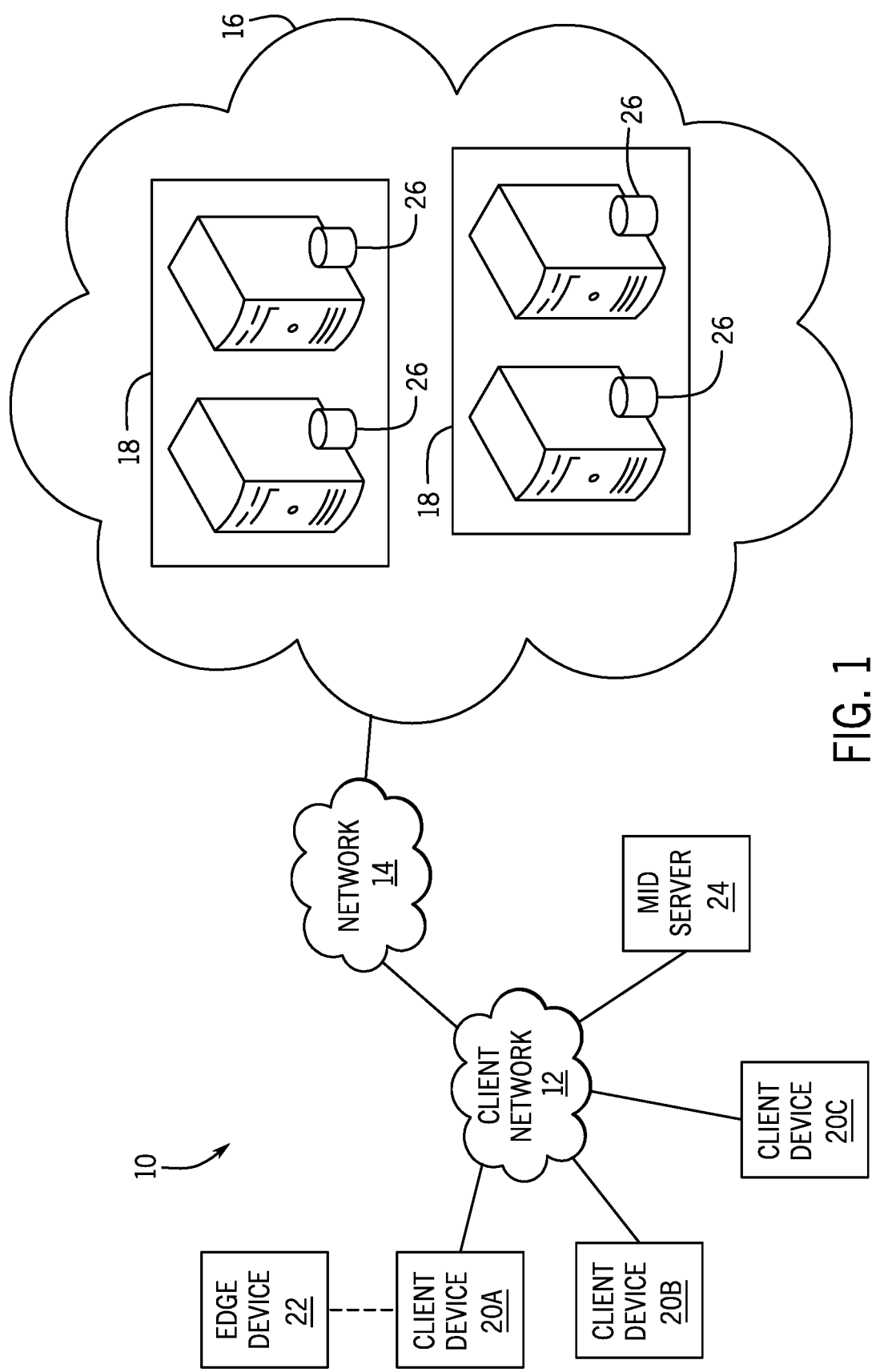
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Visualizations may help to more effectively communicate how tracked metrics associated with a cloud computing service change over time. Thus helping to achieve more efficient allocation of cloud computing resources and/or a more streamlined cloud computing service. However, manual design of visualizations may require specialized knowledge of computer programming, as well as the underlying tracked metrics. Further, manually designing a group of visualizations may result in disjointed and inconsistent aesthetics across the group of visualizations.

Accordingly, a visualization builder that generates visualizations (e.g., a score visualization or a time series visualization) based at least on a received identifier using a shared visualization library is disclosed. For example, an identifier (e.g., "sys_id") that identifies a report is received. One or more data sets and one or more style configurations are then retrieved from a shared visualization library via a backend API and passed to a router component. The router component renders a score component that outputs a score visualization if the retrieved data sets include score data. If the data sets include time series data, or the score visualization also includes a time series graph, the router component renders a time series component. The time series component passes the data sets and the style configurations to a parser that parses the data sets and the style configurations and returns one or more highcharts options objects. The time series component then passes the highcharts options objects to a highcharts component that generates the time series visualizations and/or adds the time series graph to the score visualization. Using the data sets and the style configurations retrieved from the shared visualization library as a basis for generating the visualizations gives the visualizations within a workspace, home page, dashboard, and/or report consistent design elements (e.g., color palette, typefaces, etc.), resulting in a consistent aesthetic look and feel across the visualizations. Further, because the data sets and the style configurations are retrieved from the shared visualization library, a user does not have to manually generate these elements with computer code.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
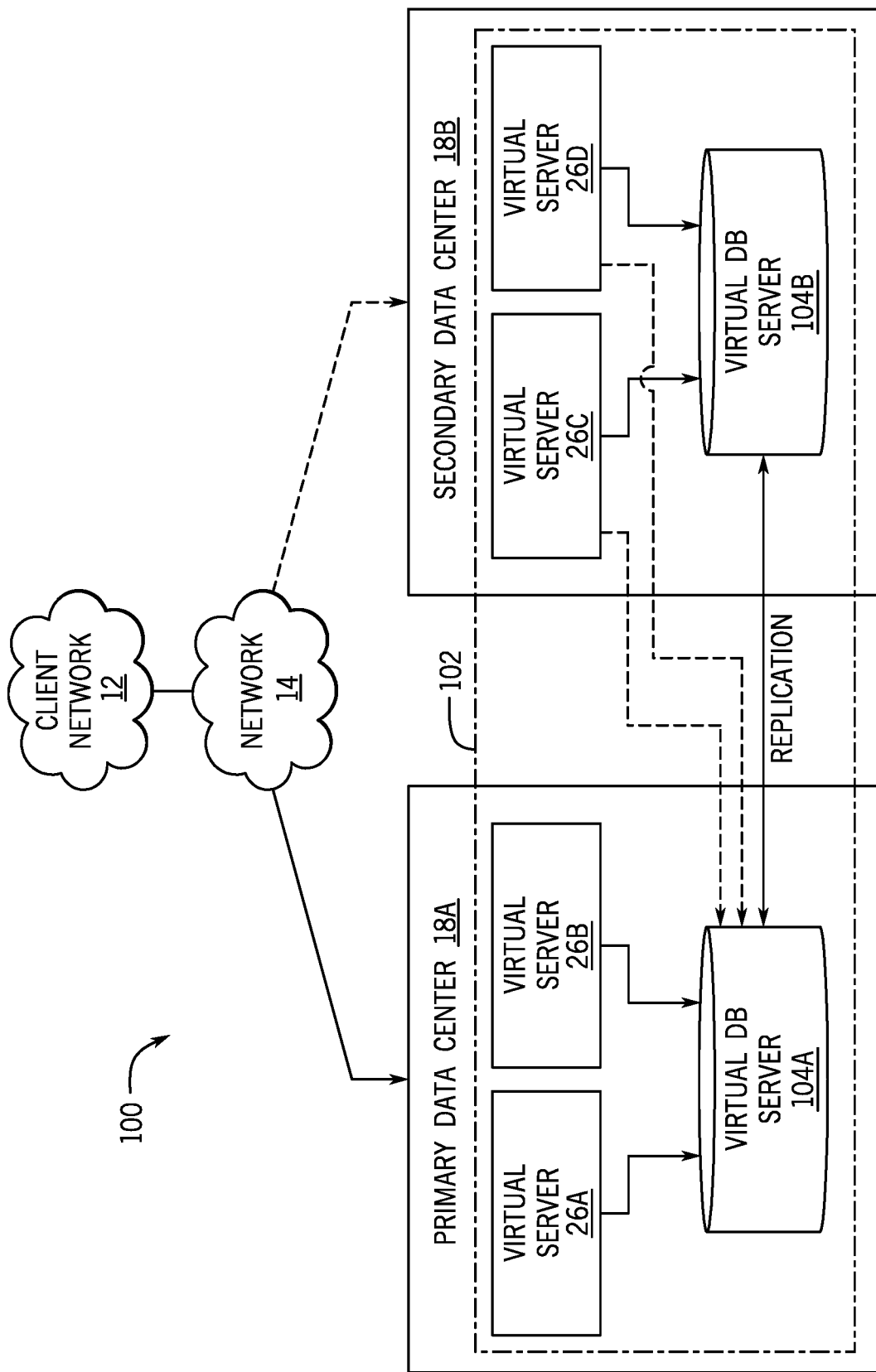
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2). Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/ server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
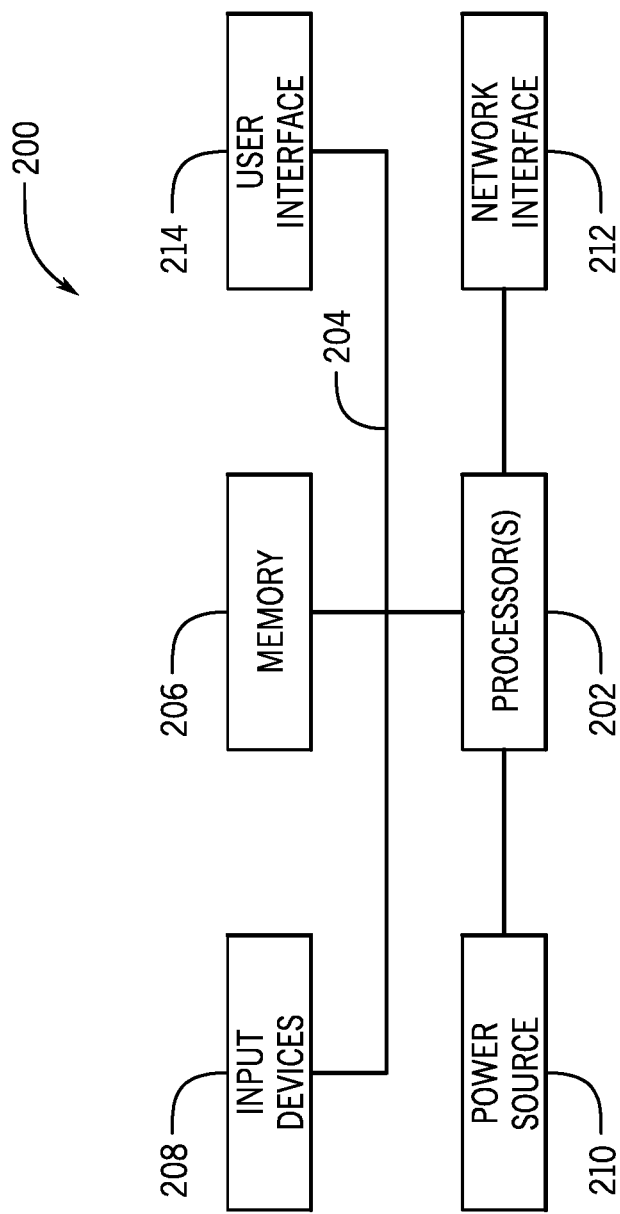
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
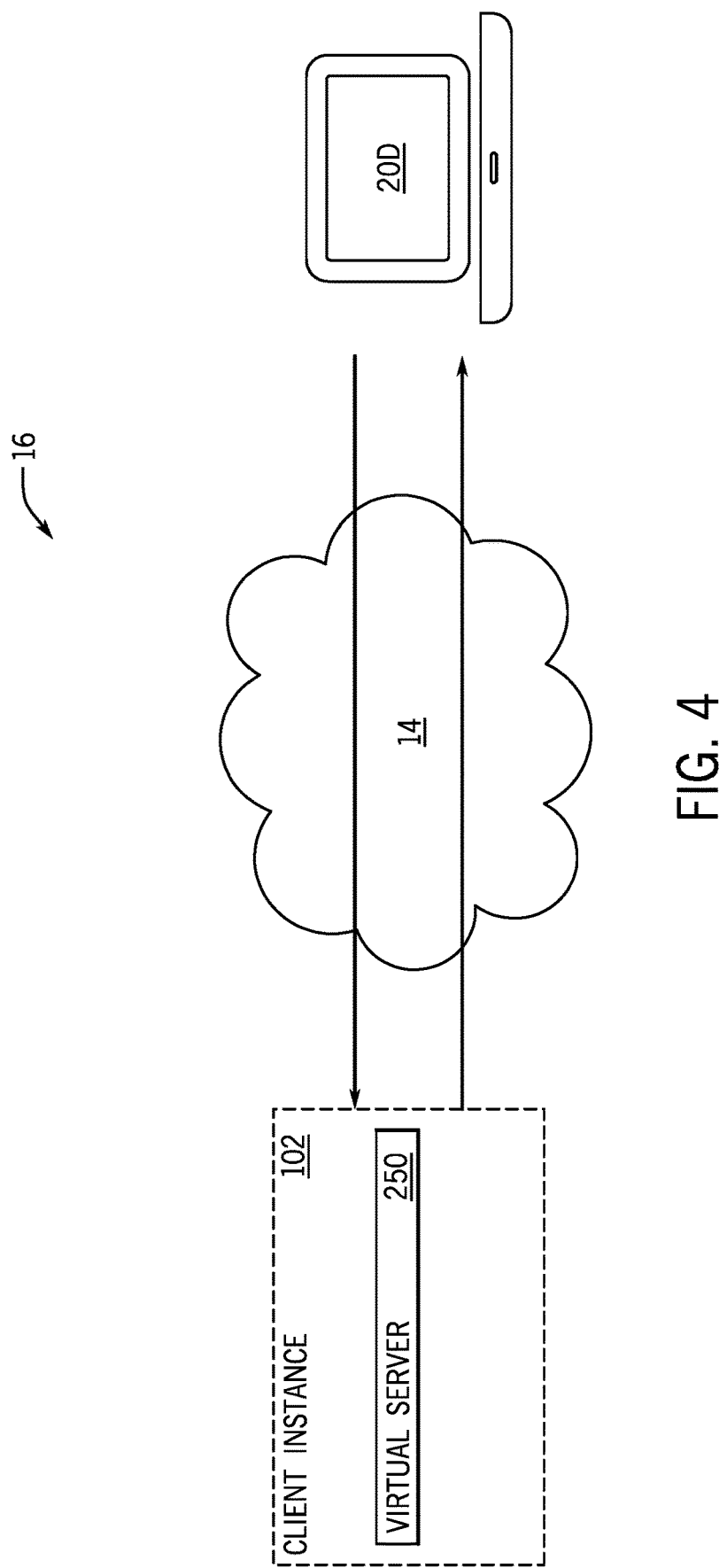
FIG. 4 is a block diagram illustrating an embodiment in which a virtual server supports and enables the client instance, in accordance with aspects of the present disclosure.

With the foregoing in mind, FIG. 4 is a block diagram illustrating an embodiment in which a virtual server 250 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
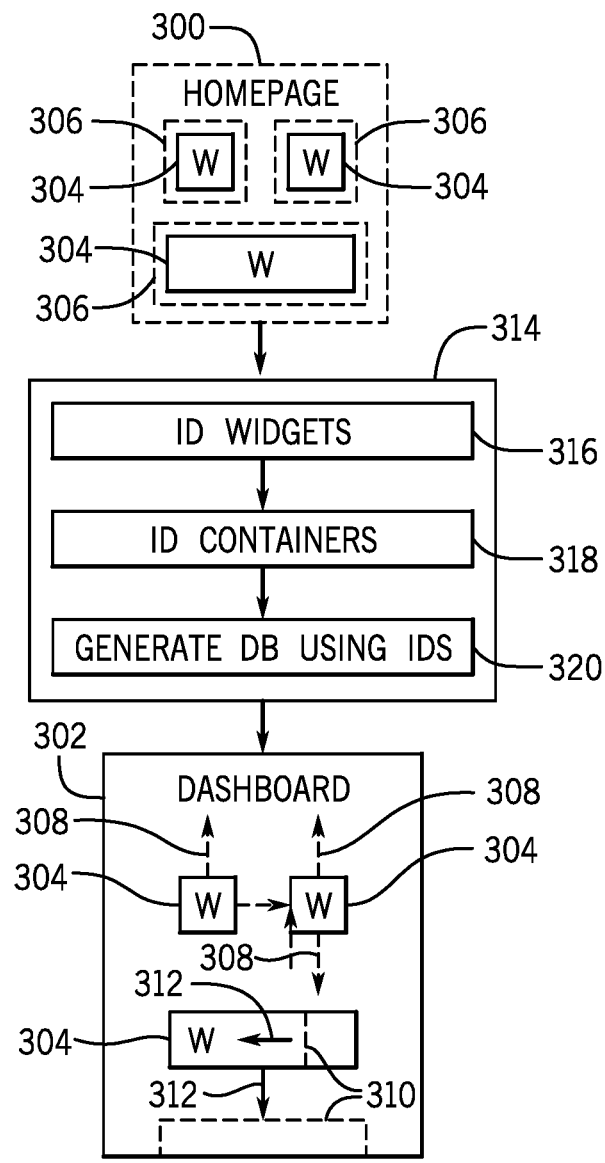
FIG. 5 is a block diagram illustrating performance analytics and reporting (PAR) features facilitated through a workspace, homepage, dashboard, report viewer/builder, etc., in accordance with an embodiment.

The discussion now turns to a mechanism for displaying system data via one or more visualizations, enabling interactivity with the system data, and reporting on the system data. FIG. 5 is a block diagram illustrating performance analytics and reporting (PAR) features facilitated through a homepage 300 and/or dashboard 302, in accordance with an embodiment. It should be understood, however, that the homepage 300 and dashboard 302 are merely examples and that in other embodiments, visualizations may be created for workspace environments, reports, etc. in addition to homepages and dashboards. As used herein, a "homepage" refers to a graphical-user-interface (GUI) screen where data-driven widgets 304 may be placed in pre-defined containers 306 that have a static placement and/or size. In the instant embodiment, one or more of the widgets 304 include visualizations from a shared visualization library.

In some embodiments, it may be desirable to enable customized positioning and/or sizing of widgets 304. Accordingly, the dashboard 302 may be used to provide such features. As used herein, the term "dashboard" refers to a graphical-user-interface (GUI) screen where data-driven widgets 304 may be placed on the screen without being constrained to pre-defined containers 306 and/or static placement and/or size. In other words, for the dashboard 302, the widgets 304 may be dynamically moved to any location on the dashboard 302 without being constrained to pre-defined locations, as indicated by arrows 308. Further, the size of the widgets 304 may be dynamically altered in the dashboard 302, as indicated by sizing indicators 310 and arrows 312.

As there may be more flexibility in configuring a dashboard 302 over a homepage 300, it may be desirable in certain situations to convert a homepage 300 to a dashboard 302. Indeed, it may be burdensome to generate dashboards 302 from scratch after time and effort may have already been afforded to creating a homepage 300. Accordingly, in some embodiments, a conversion process 314 may be implemented to convert a homepage 300 to a dashboard 302.

The conversion process 314 may identify the widgets 304 found on the homepage 300 (block 316). For example, a computer-readable representation of the homepage 300 (e.g., a homepage object) may be traversed to identify each of the widgets 304 on the homepage 300.

Further, the conversion process 314 may identify the containers 306 and their associated sizes and placements for the identified widgets 304 found on the homepage 300 (block 318). For example, the computer-readable representation of the homepage 300 (e.g., a homepage object) may be traversed to identify each of containers 306 containing the widgets 304 on the homepage 300. Position and/or size attributes of the containers 306 may be identified by accessing object attributes of the computer-readable representation of the homepage 300.

Once the widgets 304 and the containers 306 and their attributes are identified. A corresponding dashboard 302 may be generated (block 320). For example, computer instructions may generate a computer-readable representation of the homepage 300, inserting the widgets 304 at the position and/or size identified by the container 306 attributes. Once the dashboard 302 is generated, it may be accessed and the size and position of the widgets 304 may be modified dynamically.

The widgets 304 may be independent data-driven software that perform particular tasks. For example, the widgets 304 may provide visualizations generated based upon data-sets of the system, such as those present within database. The widgets 304 may be selected, for example, from a library (e.g., a visualization library). Widgets within the library may include pre-defined or default aspects in order to give the widgets a consistent look and feel. For example, the widgets may use colors selected from a color palette, a limited number of fonts or typefaces, consistent graphic design elements, etc.

In accordance with certain aspects of the present disclosure, the widgets 304 are generated according to a guided workflow presented as a part of a graphical user interface (GUI) configured to facilitate generation of analytics and/or reporting widgets on an embodiment of the homepage or an embodiment of the dashboard. Though widgets may be created for a wide range of functions, the instant embodiments are focused on tracking incidents. Depending on the data being tracked, an "incident" may be any occurrence that a user is interested in tracking. For example, in some embodiments, an incident may be the opening of a service ticket, the number of open service tickets on a given day, a network outage, a hardware failure, a software failure, a login failure, a request for action, an unfulfilled purchase request, a security breach, a virus or malware warning, an event, a filed complaint, or any other occurrence or metric a user is interested on monitoring.

Figure 6:
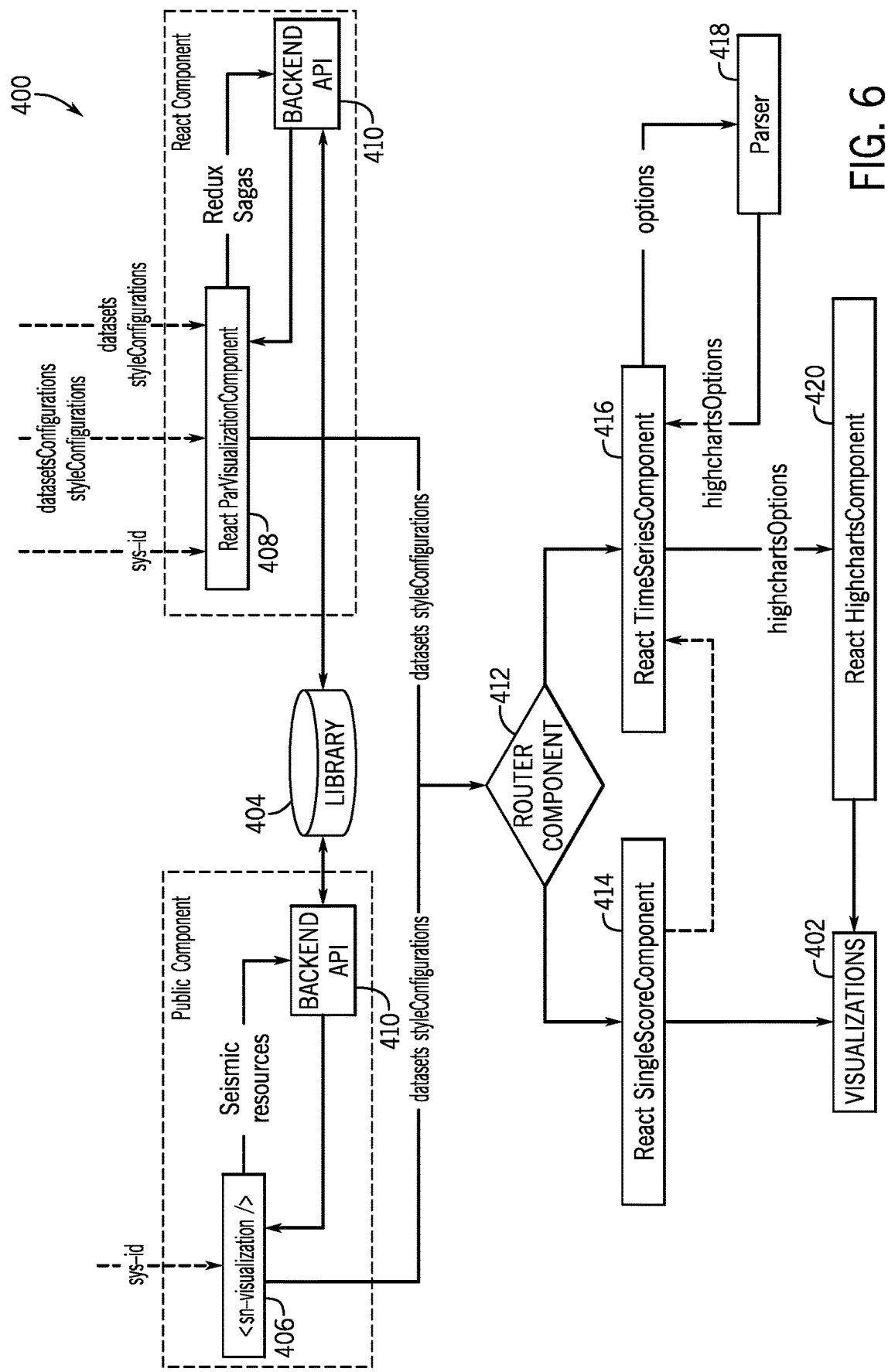
FIG. 6 illustrates a visualization builder that creates visualizations using a shared visualization library, in accordance with an embodiment.

FIG. 6 is a schematic illustrating a visualization builder 400 that creates visualizations 402 (e.g., score visualizations and time series visualizations) using a shared visualization library 404. As described above with regard to FIG. 5, various tools may be provided to a user for adjusting the layouts of workspaces, homepages, dashboards, and report viewers/builders. These workspaces, homepages, dashboards, and reports may include visualizations 402. Accordingly, tools may be provided to a user for generating and/or editing the visualizations 402 (e.g., the visualization builder 400). The visualization builder 400 may utilize the shared visualization library 404 to provide visualizations 402 with a consistent look and feel. The shared visualization library 404 may include templates that specify properties of the visualizations 402. For example, the templates may specify colors selected from a color palette, a limited number of fonts or typefaces, consistent graphic design elements, etc.

As illustrated in FIG. 6, the visualization builder 400 includes a public component 406 ("<sn-visualization/>"). The public component may be a web-based Seismic component that adheres to Seismic framework standards. Accordingly, the public component can send out actions (e.g., events, etc.) and can be listen to actions sent by other components. The public component 406 may include multiple sub-components, which may include React components. A React component is a JavaScript class or function that receives inputs (i.e., properties) and returns a React element that specifies how a portion of a user interface appears. In the illustrated embodiment, the public component 406 may be used for workspace visualizations, while homepage, dashboard, and report visualizations are created using a React component (e.g., "ParVisualizationComponent" 408). The public component 406 uses Seismic resources rather than passing data to one or more React components, or React subcomponents, and the having the React components fetch data because, in some applications, it may be preferable to use the batch processing of Seismic resources. However, in other embodiments, it may be beneficial to utilize React components instead of Seismic components.

The public component 406 receives an identifier (e.g., "sys_id") identifying a report upon which the visualizations 402 will be based. In the instant embodiment, the identifier, "sys_id", is a 32 character, globally unique ID (GUID) that identifies a record in a table. Seismic resources are used to retrieve one or more data sets and one or more style configurations from the shared visualization library 404 via a backend API 410. The data sets may include an array of data, multiple arrays of data, or one or more arrays of arrays of data for the visualizations 402. In some embodiments, the data sets may include multiple series of data per data set. As such, a data set may include multiple series of data and a single style configuration. In other embodiments, multiple data sets may use a single style configuration or each data set may have its own style configuration. The style configurations may include, for example, a flatmap specifying the style of the associated visualization 402. The style configurations may also include one or more keys, each corresponding to one or more properties specified within the highcharts options described in more detail below. The public component 406 provides the data sets and the style configurations to a router component 412.

As previously described, in some embodiments, visualizations for homepages, dashboards, and/or reports may be generated using the PAR visualization component 408 rather than the public component 406. In such an embodiment, the PAR visualization component 408 receives the identifier ("sys_id"), the data sets, the style configurations, and the data sets, or some combination thereof, and retrieves additional data sets and style configurations from the shared visualization library 404 via the back end API 410 that are combined with (e.g., merged with or otherwise added to) the received data sets and style configurations. In some embodiments, the PAR visualization component 408 may utilize middleware (e.g., Redux Saga) to interface with the back end API 410. The PAR visualization component 408 provides the data sets and the style configurations to the router component 412.

The router component 412 may be a React component with a switch for data types (e.g., "datasets[0].type"). The router component 412 provides the data sets and the style configurations to a single score component 414 and/or time series component 416 based on what visualizations are requested and the data set type provided (e.g., based on "datasets[0].type"). For example, in the case of "single_score", the router component 412 renders the single score component 414, which may be a React component. In the case of "time_series", the router component 412 renders the time series component 416, which may also be a React component. In some embodiments (e.g., data sets for both single score and time series are provided, and/or the score visualization 402 is to include a time series graph), the router component 412 may render both the single score component 414 and the time series component 416.

The single score component 414 receives the data sets and the style configurations, pulled from the shared visualization library 404 via the backend API 410, from the router component 412 and determines the single score based on the data sets. The single score component 414 then generates a score visualization 402 displaying the single score based on the style configurations. In some embodiments, the score visualization 402 may also include a time series graph. In such an embodiment, the single score component 414 outputs the score visualization 402 to the time series component 416 for addition of the time series graph.

The time series component 416 receives data sets and style configurations and passes them to a parser 418. The parser 418 receives the data sets and the style configurations from the time series component 416, parses the data sets and the style configurations, and returns highcharts options to the time series component 416. The parser 418 may include, for example, a library that receives the data sets and the style configurations, and parses the data sets and the style configurations without modifying the data sets and the style configurations. The parser 418 may extract one or more time series from the data sets, assign Y axis indexes, parse the style configurations, and then output one or more highcharts options objects based on the parsed data. The parser 418 may have significant code coverage (e.g., in some cases as high as 100%), and may include unit tests that are not mutated or otherwise modified, such that the memory footprint stays low and transforms occur quickly. The time series component 416 receives highcharts options from the parser 418 and passes the highcharts options to a highcharts component 420, which may also be a React component. The highcharts component 420 renders one or more highcharts based on the highcharts options passed to it from the time series component 416, and outputs one or more visualizations (e.g., time series visualizations and/or score visualizations that include time series graphs). The visualizations 402 may then be included in a workspace, a homepage, a dashboard, or a report.

The following is an example script for a visualization generated by the visualization builder 400:

```
{
  "style_configurations": [
    {
      "chart width": 750,
      "x_axis_title_size": 12,
      "custom_chart_title_position": false,
      "y_axis_title_color": "#000000",
      "y_axis_title_color_id": "65b30218a9fe3dba0120df8611520d97",
      "chart_type": "step_line",
      "y_axis_opposite": false,
      "y_axis_title_bold": true,
      "show_legend_border": true,
      "y_axis_label_size": 11,,
      "x_axis_grid_width": 1,
      "title": "test jimmy",
      "colors": [
        "#278ECF",
        "#4bd762",
        "#c2c2c2"
        // ...
      ],
      // ...
    }
  ],
  "datasets": [
    {
      "series": [
        {
          "data": [
            [1533579660000, 132.53178],
            [1533580920000, 110.73219],
            [1533582180000, 96.20068],
            [1533583440000, 106.73789],
            [1533584700000, 136.93074],
            [1533585960000, 171.26884]
            // ...
          ],
          "name": "[Altitude (m)] ML-G1-AG25-1",
          "derived_series": {
            "targets": [
              [1533579660000, 132.53178],
              [1533580920000, 110.73219]
            ],
            // ...
          },
        },
        {
          "data": [
            [1533579660000, 132.53178],
            [1533580920000, 110.73219],
            [1533582180000, 96.20068],
            [1533583440000, 106.73789],
            [1533584700000, 136.93074],
            [1533585960000, 171.26884]
            // ...
          ],
          "name": "[Altitude (m)] DC-P-NX-1"
        },
      ]
    }
  ]
}
```

FIGS. 7-9 illustrate several example of score visualizations generated by the visualization builder 400. FIG. 7 is an example of a score visualization 402 that also includes time series information. As shown, the visualization 402 includes a title 500 at the top of the window. The visualization also includes the score 502 and the time (e.g., date 504) at which the score 502 is valid. Though the visualization 402 of FIG. 7 only shows the date 504 at which the score 502 is valid, in other embodiments, the date 504 may also include a time (e.g., hours:minutes:seconds). The visualization 402 also includes a change field 506 indicating the change since last measurement. As shown, the change field 506 may include the raw change in the score number, as well as a percentage change in the score number since the last measurement. Because the visualization 402 includes time series information, the visualization 402 includes a time series graph 508, which includes a plot of the score over time. The time series graph 508 includes a line 510 indicative of a target value for the score 502. Finally, the visualization includes a see details field 512, which a user may select to see more information.

FIG. 8 illustrates an example of a score visualization 402 that does not include time series information. As with the visualization 402 shown in FIG. 7, the visualization 402 includes the title 500, the score 502, the date 504 at which the score 502 is valid, the change field 506, and the see details field 512, but no time series graph 508. Instead, the visualization 402 includes a target field 600 and a gap field 602. The target field indicates the target value for the score 502. The gap field 602 indicates the raw value of the gap between the current score 502 and the target value 600, as well as a percentage gap between the current score 502 and the target value 600.

FIG. 9 illustrates an example of a real-time score visualization 402 in a widget that does not include time series information. As with the visualization 402 shown in FIG. 8, the visualization 402 includes the title 500, the score 502, the date 504 at which the score 502 is valid, the change field 506, the see details field 512, the target field 600 and the gap field 602, but in a different layout than the visualization 402 shown in FIG. 8. Further, rather than listing a date and/or time at which the score 502 is valid, the date field 504 indicates that the score visualization 402 is a real-time visualization that updates the score in real-time or near real-time (within seconds or minutes of a change in the score, or checks the score on a regular schedule of seconds, minutes, etc.). As with the visualization shown in FIG. 8, the real-time score visualization 402 does not include a time series graph 508.

Figure 10:
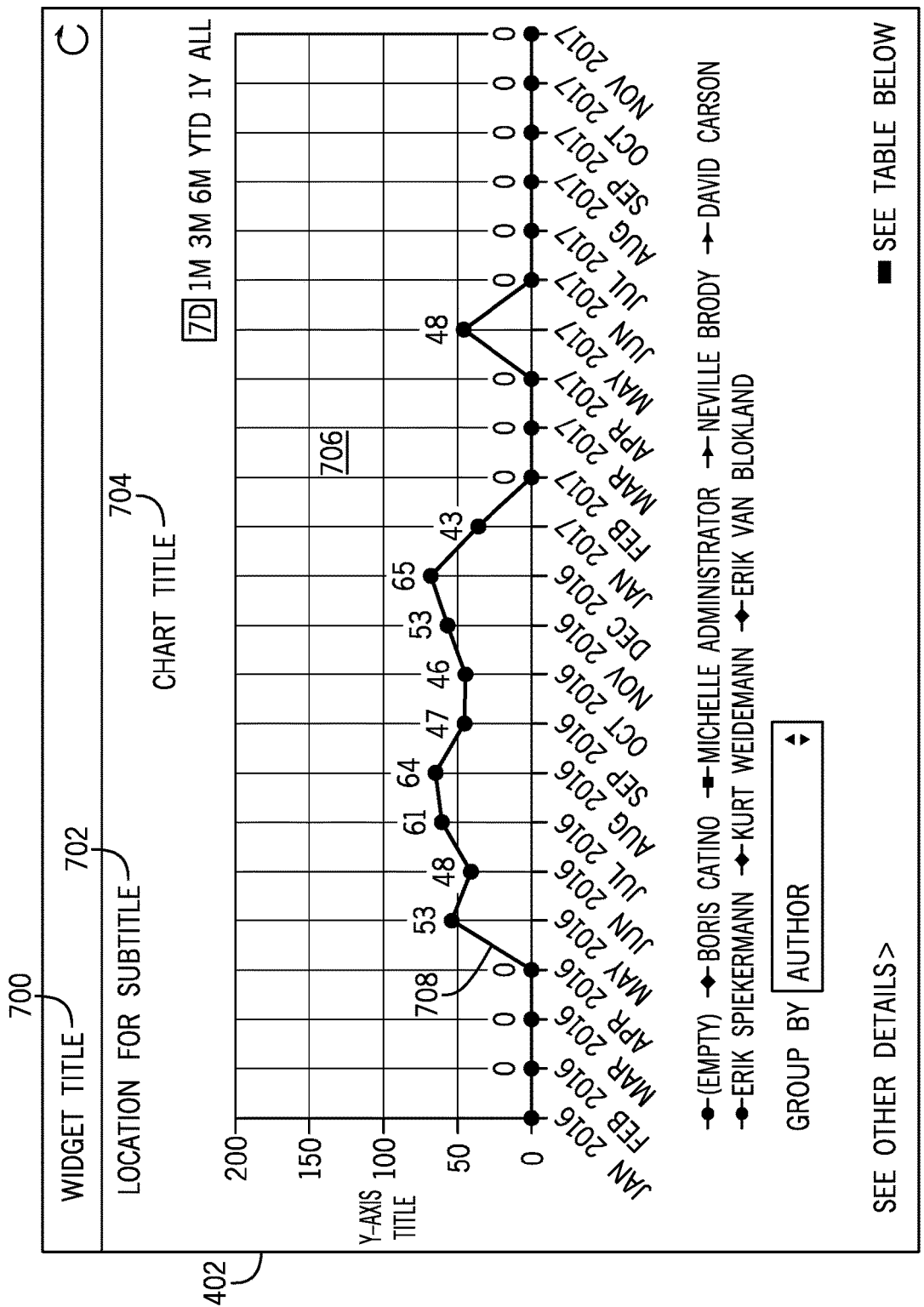
FIG. 10 is an embodiment of a time series visualization, generated by the visualization builder of FIG. 6, in accordance with aspects of the present disclosure.
Figure 11:
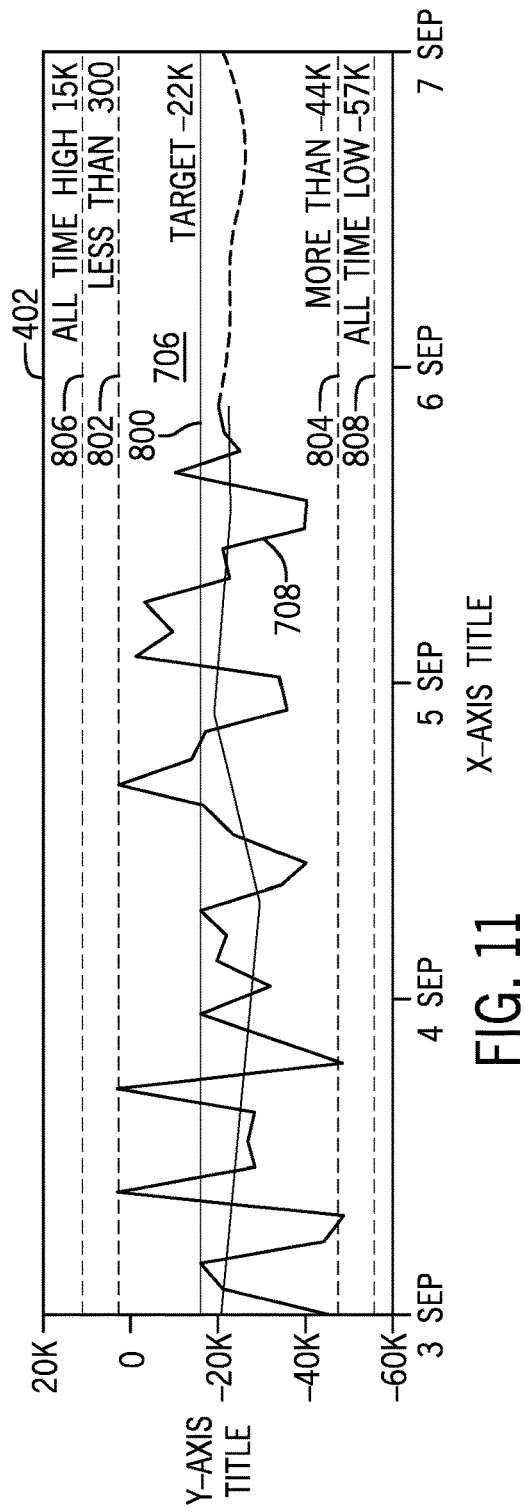
FIG. 11 is an embodiment of a time series visualization, generated by the visualization builder of FIG. 6, in accordance with aspects of the present disclosure.
Figure 12:
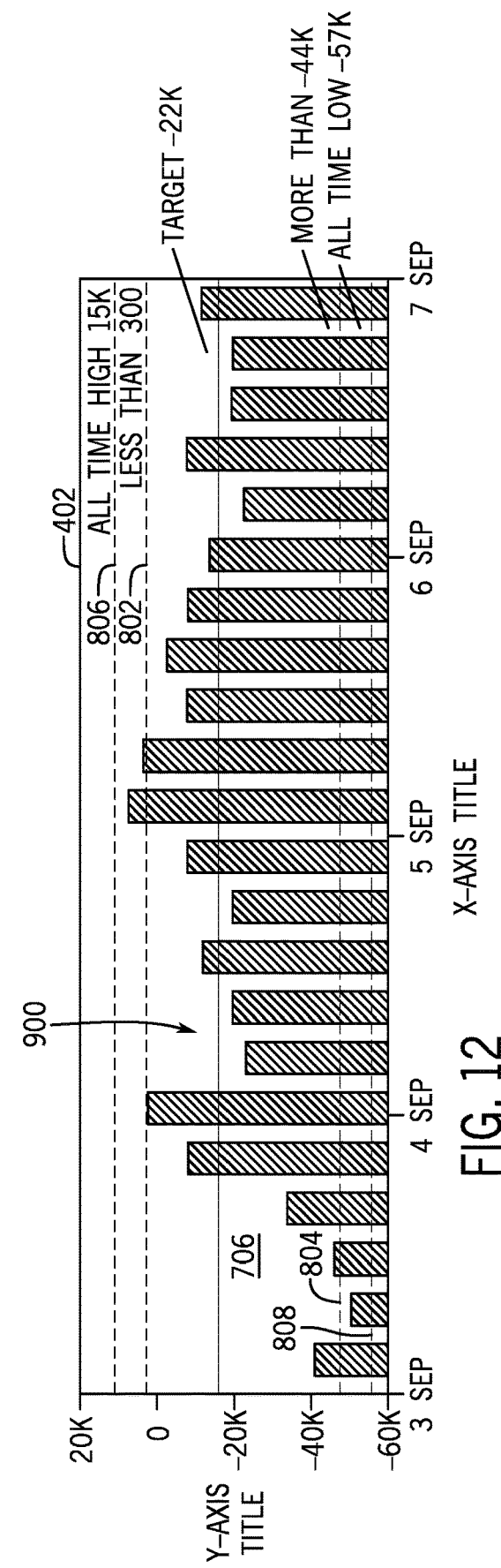
FIG. 12 is an embodiment of a time series visualization, generated by the visualization builder of FIG. 6, including a bar graph, in accordance with aspects of the present disclosure.

FIGS. 10-12 illustrate several example of time series visualizations generated by the visualization builder 400. FIG. 10 illustrates an example of a time series visualization 402. As shown, the visualization 402 includes a widget title 700 and a widget subtitle 702 at the top of the window, as well as a chart title 704. The visualization 402 includes a plot window 706, which may include a line 708 representing a variable plotted to correspond with the underlying data. As shown, the plot window 706 includes a horizontal axis representing time and a vertical axis representing values for the variable being plotted. In some embodiments, the plot window 706 may include plots for multiple variables.

FIG. 11 illustrates another example of the time series visualization 402. As with the visualization 402 shown in FIG. 10, the visualization 402 shown in FIG. 11 includes a line 708 plotted in a plot window 706 to represent the value of the variable over time, with a horizontal axis representing time and a vertical axis representing values for the variable being plotted. However, the layout of the visualization 402 shown in FIG. 11 is different from that shown in FIG. 10. Additionally, the plot window 706 includes horizontal lines (e.g., solid, dotted, or dashed) representing a target value 800 for the variable, an upper threshold 802, a lower threshold 804, an all-time high 806, and an all-time low 808. In some embodiments, the plot window 706 may also include lines representing high and low values for set windows of time. Further, though not shown, the visualizations may include colors and/or gradients to indicate trends, regions, allocation/distribution of value, etc.

FIG. 12 illustrates another example of the time series visualization 402. However, rather than the line graph shown in FIG. 11, the plot window 706 of the visualization in FIG. 12 includes a bar graph 900. As with the visualization 402 shown in FIG. 11, the visualization 402 shown in FIG. 12 includes a horizontal axis representing time and a vertical axis representing values for the variable being plotted and horizontal lines (e.g., solid, dotted, or dashed) representing the target value 800 for the variable, the upper threshold 802, the lower threshold 804, the all-time high 806, and the all-time low 808. As with the visualization in FIG. 11, the plot window 706 may also include lines representing high and low values for set windows of time, as well as colors and/or gradients to indicate trends, regions, allocation/distribution of value, etc.

Figure 13:
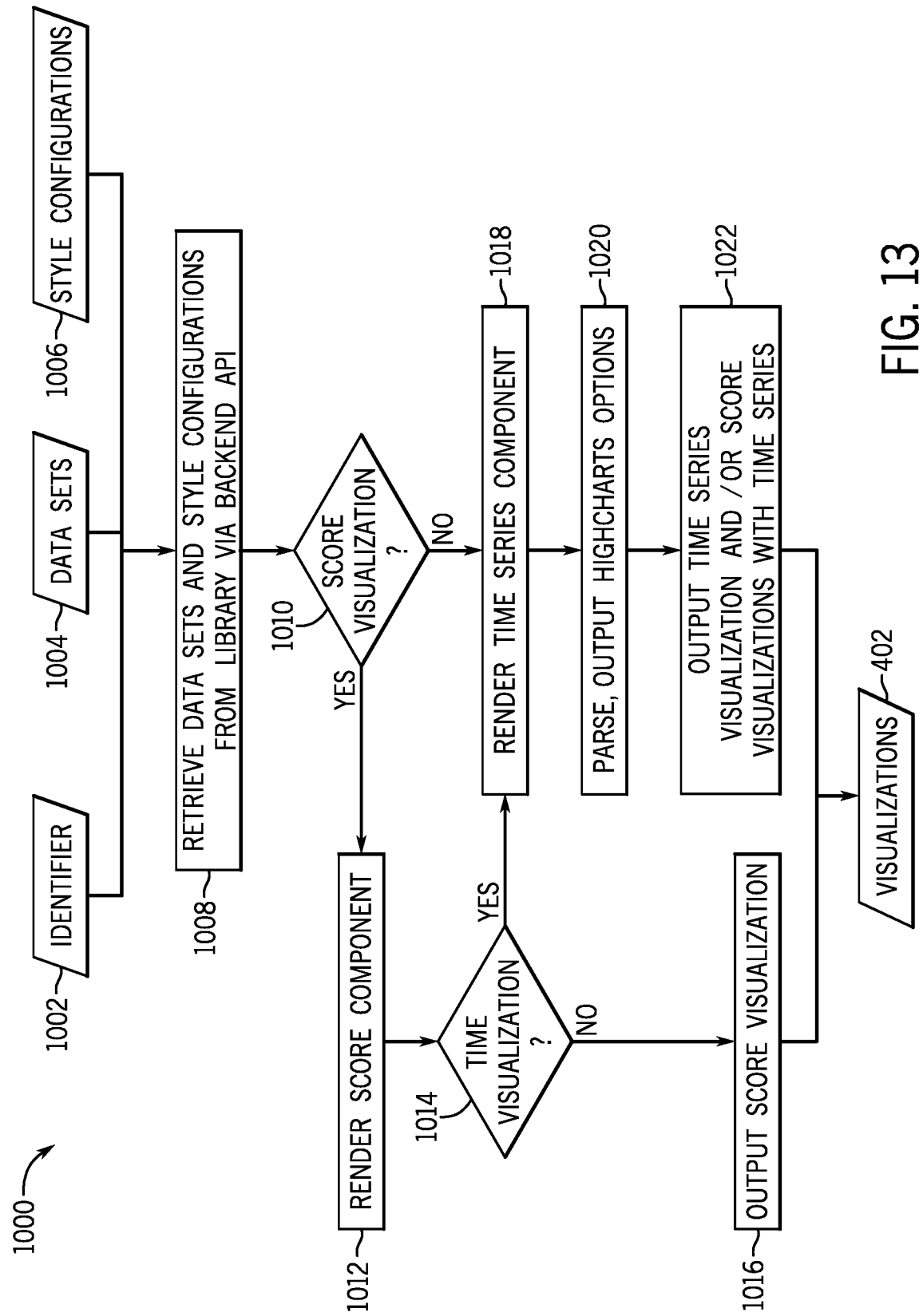
FIG. 13 is a flow chart of a process for generating visualizations using a shared visualization library via the visualization builder of FIG. 6, in accordance with aspects of the present disclosure.

FIG. 13 is a flow chart of a process 1000 for generating visualizations using the shared visualization library via the visualization builder. A component (e.g., the public component or the PAR visualization component) receives an identifier 1002 (e.g., "sys_id") that identifies a record in a table, in this case a report. As described above with regard to FIG. 6, when building a workspace visualization, the public component receives the identifier 1002. However, when building a homepage, dashboard, or report visualization, the PAR visualization component may receive some combination of the identifier 1002, one or more data sets 1004, and one or more style configurations 1006. At block 1008, data sets and style configurations for the visualization are retrieved from the shared visualization library via the backend API based on the received identifier 1002, the one or more data sets 1004, and the one or more style configurations 1006. If one or more data sets 1004 and/or one or more style configurations 1006 were received, then the one or more data sets, and the one or more style configurations retrieved from the shared visualization library via the backend API may be merged with or otherwise combined with the received one or more data sets 1004, and one or more style configurations 1006. The data sets and style configurations for the visualization are then passed to a router component.

At decision 1010 the router component determines whether the received data sets correspond to a score visualization. If yes, the router component renders a score component (block 1012) to generate the score visualization. At decision 1014, the system determines whether the score visualization includes any time series information. If not, the process 1000 proceeds to block 1016 and outputs the score visualization 402. If the score visualization does include time series information (decision 1014) or the data sets do not include data for a score visualization (decision 1010), the router component renders the time series component (block 1018).

At block 1020, the time series component passes the data sets and the style configurations to the parser, which parses the data sets and the style configurations, and returns highcharts options objects. At block 1022 the time series component generates the time series visualizations 402 and/or the score visualizations with time series information.

The disclosed techniques include generating a visualization (e.g., a score visualization or a time series visualization) based at least on a received identifier. For a workspace environment visualization, a public component receives an identifier (e.g., "sys_id") that identifies a report. The public component then retrieves one or more data sets and one or more style configurations from a shared visualization library via a backend API and passes the retrieved data sets and style configurations to a router component. For visualizations intended for homepages, dashboards, and/or reports, a PAR Visualization Component receives an identifier (e.g., "sys_id") that identifies a report, data sets, style configurations, or some combination thereof. The PAR Visualization Component then retrieves one or more data sets and one or more style configurations from the shared visualization library via the backend API and passes the retrieved data sets and style configurations to the router component. The router component includes a switch that renders a score component if the retrieved data sets include score data. The score component may then output a score visualization. If the data sets include time series data, or the score visualization also includes a time series graph, the router component renders a time series component. The time series component passes the data sets and the style configurations to a parser that parses the data sets and the style configurations and outputs one or more highcharts options objects to the time series component. The time series component then passes the highcharts options objects to a highcharts component that generates the time series visualizations and/or adds the time series graph to the score visualization. Using the data sets and the style configurations retrieved from the shared visualization library as a basis for generating the visualizations gives the visualizations within a workspace, home page, dashboard, and/or report consistent design elements (e.g., color palette, typefaces, etc.), resulting in a consistent aesthetic look and feel across the visualizations. Further, because the data sets and the style configurations are retrieved from the shared visualization library, a user does not have to manually generate these elements with computer code.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor;
a memory, accessible by the processor, and storing instructions that, when executed by the processor, cause the processor to:
receive an identifier identifying a report;
retrieve, via a backend API, one or more data sets and one or more style configurations associated with the report from a shared visualization library, wherein the shared visualization library comprises a plurality of visualization templates;
in response to a determination that the one or more data sets comprise data for a score visualization:
render a score component; and
generate the score visualization based on the one or more data sets and the one or more style configurations; and in response to a determination that the one or more data sets comprise data for a time series visualization:
render a time series component;
parse the one or more data sets and the one or more style configurations and output a highcharts options object; and
generate the time series visualization based on the highcharts options object.

2. The system of claim 1, wherein the memory stores instructions defining a public component that, when executed by the processor, causes the processor to render the public component, wherein the public component receives the identifier and retrieves the one or more data sets and the one or more style configurations from the shared visualization library via the backend API, wherein the score visualization and the time series visualization are for a workspace environment.

3. The system of claim 1, wherein the memory stores instructions defining a PAR visualization component that, when executed by the processor, causes the processor to render the PAR visualization component, wherein the PAR visualization component receives the identifier and retrieves the one or more data sets and the one or more style configurations from the shared visualization library via the backend API, wherein the score visualization and the time series visualization are for a homepage, a dashboard, or the report.

4. The system of claim 1, the memory storing instructions that, when executed by the processor, cause the processor to:
in response to a determination that the one or more data sets associated with the score visualization also include time series data, adding a time series graph to the score visualization.

5. The system of claim 4, wherein adding the time series graph to the score visualization comprises:
passing the score visualization to the time series component;
parsing the one or more data sets and the one or more style configurations;
outputting a second highcharts options object;
generating the time series graph based on the second highcharts options object; and
updating the score visualization to include the time series graph.

6. The system of claim 4, wherein the score visualization comprises the time series graph.

7. The system of claim 1, wherein the score visualization comprises a real-time score visualization configured to update a score within the score visualization in real-time or near-real-time.

8. The system of claim 1, wherein the time series visualization comprises a target value line, an upper threshold line, and a lower threshold line.

9. The system of claim 1, wherein the time series visualization comprises an all time high value line and all time low value line.

10. The system of claim 1, wherein the score visualization and the time series visualization are defined by portions of code.

11. A system, comprising:
an enterprise management datacenter remotely located from one or more client networks;
a client instance hosted by the enterprise management datacenter, wherein the client instance is generated for the one or more client networks, wherein the enterprise management datacenter is configured to perform operations comprising:
receive, via the client instance, an identifier identifying a report;
retrieve, via a backend API, one or more data sets and one or more style configurations associated with the report from a shared visualization library, wherein the shared visualization library comprises a plurality of visualization templates;
in response to a determination that the one or more data sets comprise data for a score visualization:
render a score component; and
generate the score visualization based on the one or more data sets and the one or more style configurations; and
in response to a determination that the one or more data sets comprise data for a time series visualization:
render a time series component;
parse the one or more data sets and the one or more style configurations and output a highcharts options object; and
generate the time series visualization based on the highcharts options object.

12. The system of claim 11, the operations comprising:
rendering a public component;
receiving, via the public component, the identifier; and
retrieving, via the public component, the one or more data sets and the one or more style configurations from the shared visualization library via the backend API, wherein the score visualization and the time series visualization are for a workspace environment.

13. The system of claim 11, the operations comprising:
rendering a PAR visualization component;
receiving, via the PAR visualization component, the identifier; and
retrieving, via the PAR visualization component, the one or more data sets and the one or more style configurations from the shared visualization library via the backend API, wherein the score visualization and the time series visualization are for a homepage, a dashboard, or the report.

14. The system of claim 11, the operations comprising:
in response to a determination that the one or more data sets associated with the score visualization also include time series data, adding a time series graph to the score visualization.

15. The system of claim 14, wherein adding the time series graph to the score visualization comprises:
passing the score visualization to the time series component;
parsing the one or more data sets and the one or more style configurations;
outputting a second highcharts options object;
generating the time series graph based on the second highcharts options object; and
updating the score visualization to include the time series graph.

16. The system of claim 11, wherein the score visualization comprises a real-time score visualization configured to update a score within the score visualization in real-time or near-real-time.

17. The system of claim 11, wherein the time series visualization comprises a target value line, an upper threshold line, and a lower threshold line.

18. The system of claim 11, wherein the time series visualization comprises an all time high value line and all time low value line.

19. A method, comprising:
receiving, via a public component, an identifier identifying a report;
retrieving, via a backend API of the public component, one or more data sets and one or more style configurations associated with the report from a shared visualization library, wherein the shared visualization library comprises a plurality of visualization templates;
in response to a determination by a router component that the one or more data sets comprise data for a score visualization:
rendering a score component; and
generating, via the score component, the score visualization based on the one or more data sets and the one or more style configurations; and
in response to a determination by the router component that the one or more data sets comprise data for a time series visualization:
rendering a time series component;
parsing, via a parser of the time series component, the one or more data sets and the one or more style configurations and outputting a highcharts options object; and
generating, via a highcharts component, the time series visualization based on the highcharts options object.

20. The method of claim 19, wherein generating the score visualization comprises generating a first portion of code that defines the score visualization, and wherein generating the time series visualization comprises generating a second portion of code that defines the time series visualization.

* * * * *